US012800769B2

(12) United States Patent
Demaeyer et al.

(10) Patent No.: US 12,800,769 B2
(45) Date of Patent: Nov. 17, 2026

(54) CONFIGURATION CONTROL CIRCUITRY AND CONFIGURATION CONTROL METHOD

(71) Applicant: Sony Semiconductor Solutions Corporation, Atsugi (JP)

(72) Inventors: Jonathan Demaeyer, Stuttgart (DE); Manuel Amaya-Benitez, Stuttgart (DE); Morin Dehan, Stuttgart (DE); Valerio Cambareri, Stuttgart (DE)

(73) Assignee: Sony Semiconductor Solutions Corporation, Atsugi (JP)

( * ) Notice: Subject to any disclaimer, the term of this patent is extended or adjusted under 35 U.S.C. 154(b) by 536 days.

(21) Appl. No.: 18/275,808

(22) PCT Filed: Feb. 8, 2022

(86) PCT No.: PCT/EP2022/052980
§ 371 (c)(1),
(2) Date: Aug. 4, 2023

(87) PCT Pub. No.: WO2022/171607
PCT Pub. Date: Aug. 18, 2022

(65) Prior Publication Data

US 2024/0094400 A1 Mar. 21, 2024

(30) Foreign Application Priority Data

Feb. 11, 2021 (EP) .................................... 21156541

(51) Int. Cl.
*G01C 3/08* (2006.01)
*G01S 7/487* (2006.01)
*G01S 17/894* (2020.01)

(52) U.S. Cl.
CPC ............ *G01S 17/894* (2020.01); *G01S 7/487* (2013.01)

(58) Field of Classification Search
CPC ............................... G01S 17/894; G01S 7/487
See application file for complete search history.

(56) References Cited

U.S. PATENT DOCUMENTS

| | | | |
|---|---|---|---|
| 5,227,830 | A | 7/1993 | Yoshihara |
| 5,907,629 | A | 5/1999 | Funt |
| 9,760,837 | B1 | 9/2017 | Nowozin |
| 10,801,886 | B2 | 10/2020 | Mandai et al. |

(Continued)

FOREIGN PATENT DOCUMENTS

| | | | |
|---|---|---|---|
| CN | 107148640 | A | 9/2017 |
| CN | 108885701 | A | 11/2018 |

(Continued)

OTHER PUBLICATIONS

International Search Report and Written Opinion mailed on Jun. 3, 2022, received for PCT Application PCT/EP2022/052980, filed on Feb. 8, 2022, 17 pages.

(Continued)

*Primary Examiner* — Mark Hellner
(74) *Attorney, Agent, or Firm* — XSENSUS LLP

(57) ABSTRACT

A configuration control circuitry for a time-of-flight system, the time-of-flight system including an illumination source configured to emit light to a scene and an image sensor configured to generate image data representing a time-of-flight measurement of light reflected from the scene.

20 Claims, 5 Drawing Sheets

(56) References Cited

U.S. PATENT DOCUMENTS

| | | | |
|---|---|---|---|
| 10,891,745 B1 | 1/2021 | Potter | |
| 2016/0284095 A1 | 9/2016 | Chalom | |
| 2017/0272651 A1 | 9/2017 | Mathy et al. | |
| 2018/0054581 A1* | 2/2018 | Sano | H04N 25/134 |
| 2020/0074266 A1 | 3/2020 | Peake et al. | |
| 2020/0284883 A1 | 9/2020 | Ferreira et al. | |
| 2020/0372682 A1* | 11/2020 | Kim | G06N 3/084 |
| 2021/0004937 A1 | 1/2021 | Bleyer | |
| 2022/0050206 A1* | 2/2022 | Na | G01S 17/86 |

FOREIGN PATENT DOCUMENTS

| | | | | |
|---|---|---|---|---|
| CN | 110032979 A | | 7/2019 | |
| CN | 110866977 A | | 3/2020 | |
| CN | 111596978 A | | 8/2020 | |
| CN | 111988544 A | * | 11/2020 | G06N 3/044 |
| WO | WO-20190109801 A1 | | 6/2019 | |
| WO | 2020/193412 A1 | | 10/2020 | |
| WO | 2020/245767 A1 | | 12/2020 | |

OTHER PUBLICATIONS

Wetzel J et al, "Scene-Adaptive Optimization Scheme for Depth Sensor Networks", Collaborative European Research Conference 2019, https://ceur-ws.org/Vol-2348/short03.pdf.

* cited by examiner

CONFIGURATION CONTROL CIRCUITRY AND CONFIGURATION CONTROL METHOD

CROSS-REFERENCE TO RELATED APPLICATIONS

The present application is based on PCT filing PCT/EP2022/052980, filed Feb. 8, 2022, and claims priority to EP Application Serial No. 21156541.1, filed Feb. 11, 2021, the entire contents of each are incorporated herein by reference.

TECHNICAL FIELD

The present disclosure generally pertains to a configuration control circuitry for a time-of-flight system and a corresponding configuration control method for a time-of-flight system.

TECHNICAL BACKGROUND

Generally, time-of-flight (ToF) devices or systems are known. Such ToF systems are typically used for determining a distance to objects in a scene or a depth map of (the objects in) the scene that is illuminated with modulated light. Known time-of-flight systems typically include an illumination unit (e.g., including an array of light emitting diodes ("LED")) and an imaging unit including an image sensor (e.g., an array of current-assisted photonic demodulator ("CAPD") pixels or an array of single-photon avalanche diode ("SPAD") pixels) with read-out circuitry and optical parts (e.g., lenses), and it may include a processing unit (e.g., a processor), for example, when depth data representing a depth map of a scene is generated on the ToF device.

Typically, time-of-flight includes a variety of methods that measure the time that, for example, a light wave needs to travel a distance in a medium. Known ToF systems can obtain depth information of objects in a scene for every pixel of a depth image captured with an imaging unit. Known are, for example, direct ToF ("dToF") systems and indirect ToF ("iToF") systems which both may be configured as using either flood (as in frill-field ToF) illumination, or an illumination with another beam profile (e.g., as in spot ToF, line-scan ToF, structured light, etc).

For capturing a depth image in an iToF system, the iToF system typically illuminates the scene with, for instance, a modulated light wave and images the backscattered/reflected light wave with an optical lens portion on the image sensor, as generally known. The image sensor may include a pixel array, wherein a gain of the pixels of the pixel array is modulated according to a demodulation signal which may be phase-shifted with respect to the modulation of the light wave, thereby generating image data indicative for the distance to the objects in the scene. The generated image data may be output to a processing unit for image processing and depth information generation.

Typically, ToF systems operate with a predetermined configuration including different configuration parameters of the ToF system setup, including settings for the illumination unit and the imaging unit such as output power, modulation frequency, and sensor integration time.

Although there exist techniques for setting the configuration of a ToF system, it is generally desirable to improve the existing techniques.

SUMMARY

According to a first aspect the disclosure provides a configuration control circuitry for a time-of-flight system, the time-of-flight system comprising an illumination unit configured to emit light to a scene and an imaging unit configured to generate image data representing a time-of-flight measurement of light reflected from the scene, the configuration control circuitry being configured to:

obtain the image data from the imaging unit and depth data representing a depth map of the scene, wherein the depth data is generated based on the image data;

determine a set of configuration parameters for at least one of the illumination unit and the imaging unit, wherein the set of configuration parameters is determined with a learning algorithm, wherein the learning algorithm is based on a first sub-module and a second sub-module, wherein the first sub-module is configured to estimate, based on the obtained image data and the obtained depth data, a measurement indicator of the depth map, wherein the second sub-module is configured to estimate, based on the estimated measurement indicator, the set of configuration parameters for improving a subsequent time-of-flight measurement.

According to a second aspect the disclosure provides a configuration control method for a time-of-flight system, the time-of-flight system including an illumination unit configured to emit light to a scene and an imaging unit configured to generate image data representing a time-of-flight measurement of light reflected from the scene, the configuration control method comprising:

obtaining the image data from the imaging unit and depth data representing a depth map of the scene, wherein the depth data is generated based on the image data;

determining a set of configuration parameters for at least one of the illumination unit and the imaging unit, wherein the set of configuration parameters is determined with a learning algorithm, wherein the learning algorithm is based on a first sub-module and a second sub-module, wherein the first sub-module is configured to estimate, based on the obtained image data and the obtained depth data, a measurement indicator of the depth map, wherein the second sub-module is configured to estimate, based on the estimated measurement indicator, the set of configuration parameters for improving a subsequent time-of-flight measurement.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 2:
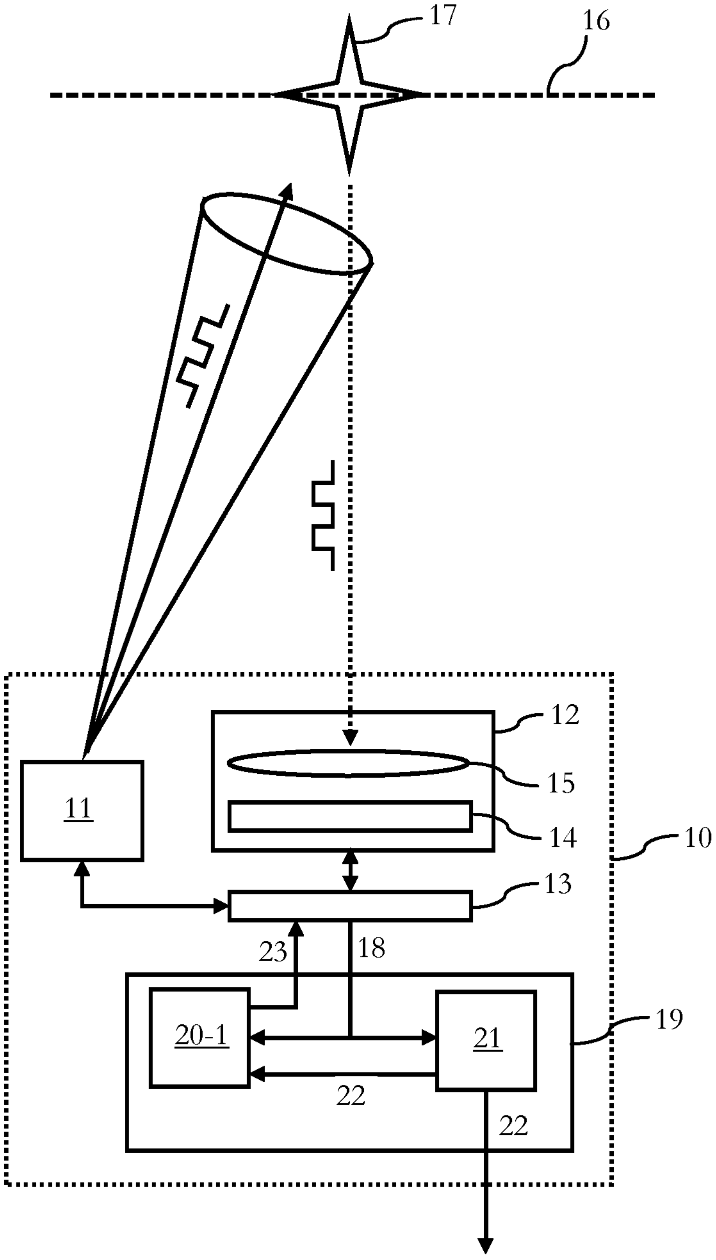
FIG. 2 schematically illustrates in a block diagram a first embodiment of a configuration control circuitry for a time-of-flight system.

Before a detailed description of the embodiments under reference of FIG. 2 is given, general explanations are made.

As mentioned in the outset, direct ToF ("dToF") systems and indirect ToF ("iToF") systems which both may be configured as full-field or spot ToF systems are known.

Figure 1:
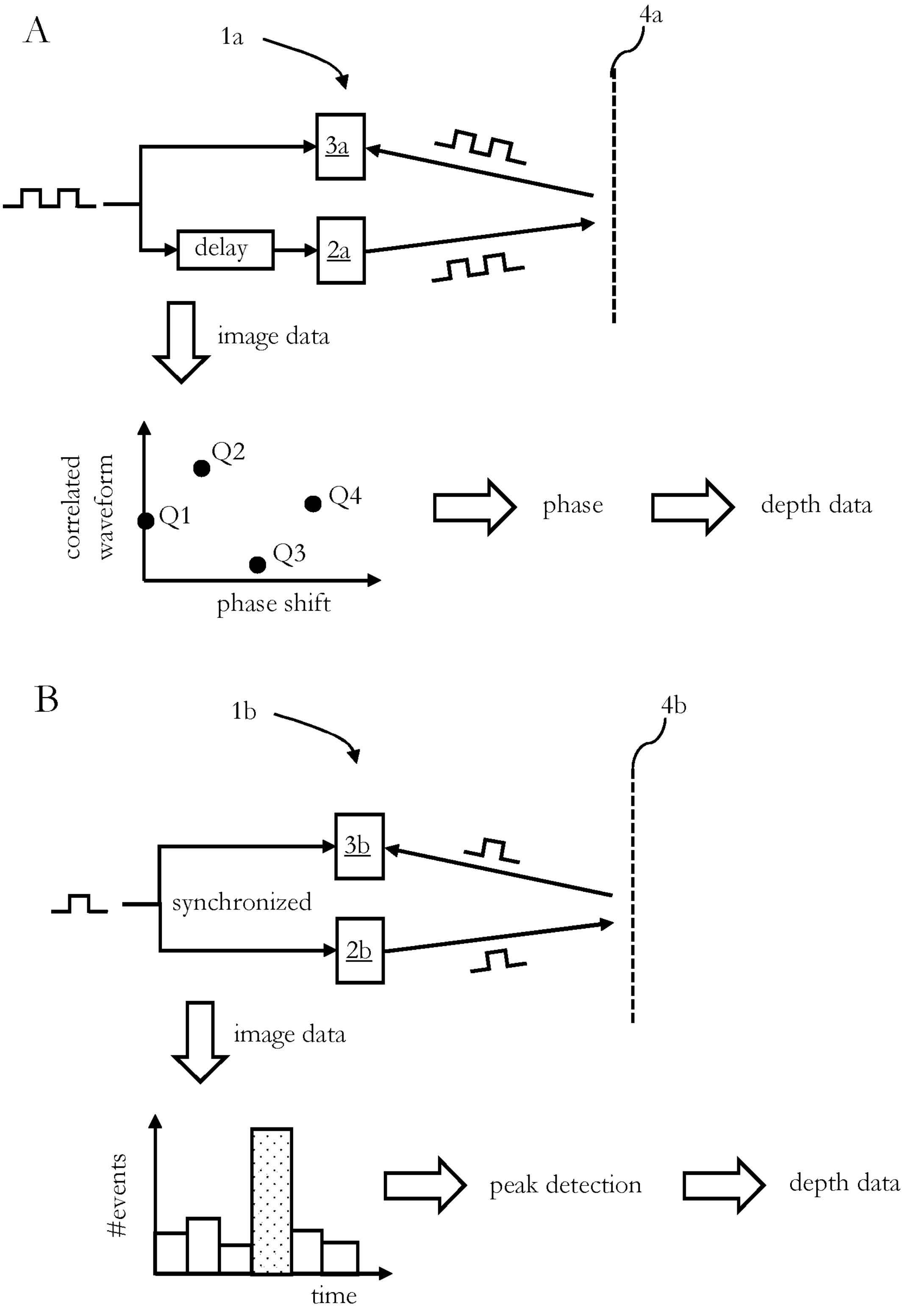
FIG. 1 schematically illustrates an embodiment of an indirect time-of-flight system in FIG. 1A and an embodiment of a direct time-of-flight system in FIG. 1B.

For enhancing the general understanding of the present disclosure, an embodiment of an iToF system 1A and an embodiment of a dToF system 1B are discussed under reference of FIG. 1 which also apply to other embodiments of the disclosure, there FIG. 1A schematically illustrates the iToF system 1*a* and FIG. 1B schematically illustrates the dToF system 1*b*.

The iToF system 1*a* includes an illumination unit 2*a* and an imaging unit 3*a*, wherein the iToF system 1*a* is configured as a full-field ToF system for providing a distance measurement.

The illumination unit 2*a* includes a light source such as an array of laser diodes, which emit light to a scene 4*a*. The intensity of the light is modulated in time according to a modulation signal (here, e.g., a rectangular modulation signal with periodic modulation according to a modulation frequency) applied to the illumination unit 2*a*. The light emitted to the scene 4*a* is reflected at objects (not shown) in the scene 4*a*.

The imaging unit 3*a* generates image data in accordance with an amount of light reflected from the scene and in accordance with the modulation signal applied to the imaging unit 3*a*. Accordingly, the imaging unit 3*a* generates a sample of a correlated waveform of the reflected light and the modulation signal.

The imaging unit 3*a* captures four frames of image data, wherein the four frames correspond to different delays or phase shifts (e.g., 0°, 90°, 180° and 270°) of the modulation signal applied to the illumination unit 2*a*.

Thus, the imaging unit 3*a* generates four samples of the correlated waveform for each pixel of an image sensor in the imaging unit 3*a*. The four samples for one pixel are shown exemplarily in FIG. 1A in the graph as charges Q1, Q2, Q3 and Q4 accumulated in the four frames (accumulated charges Q1, Q2, Q3 and Q4, as generally known, are proportional to, e.g., a voltage signal (electric signal) of a pixel from which a pixel value (digital value) is obtained and output by the image sensor as a data point of the image data and, thus, the accumulated charges Q1, Q2, Q3 and Q4 are representative for the pixel value), respectively.

From the four samples, component data (IQ values: Q is the quadrature component, I is the in-phase component) are calculated as generally known (herein: for an iToF system image data may thus include the component data and/or the pixel values, and raw data refers to the image data). From which a phase of the correlated waveform is calculated and, as generally known, depth data representing a depth map of the scene is calculated based on the phase of the correlated waveform.

The dToF system 1*b* includes an illumination unit 2*b* and an imaging unit 3*b*, wherein the dToF system 1*b* is configured as a full-field ToF system for providing a distance measurement.

The illumination unit 2*b* includes a light source such as an array of laser diodes, which emit light to a scene 4*b*. The intensity of the light is modulated in time according to a modulation signal (here e.g. a rectangular modulation signal with periodic modulation according to a modulation frequency) applied to the illumination unit 2*b*. The light emitted to the scene 4*b* is reflected at objects (not shown) in the scene 4*b*.

The imaging unit 3*b* generates image data in accordance with an amount of light reflected from the scene and in accordance with the modulation signal applied to the imaging unit 3*b*.

However, in dToF systems and in contrast to iToF systems, the modulation signal is based on spread pulses, i.e., a lower duty cycle than in iToF systems, and the modulation signals applied to the illumination unit 2*b* and the imaging unit 3*b* are synchronized. A time between two consecutive light pulses is divided in time intervals with typically equal spacing in time (duration of a single time interval is referred to as sampling interval).

The imaging unit 3*b* generates the image data in form of a histogram for each pixel of an image sensor in the imaging unit 3*b*. The histogram represents a number of events (e.g., detected photons) in each time interval based on the time-of-arrival of the reflected light pulses. This process may be repeated several times to increase a signal-to-noise ratio (SNR). Thus, in dToF systems the image data corresponds to the histogram at each pixel.

As generally known, from a peak in the number of events in the histogram, depth data representing a depth map of the scene is calculated.

However, as mentioned in the outset, such ToF systems typically operate with a predetermined configuration including different configuration parameters of the ToF system including settings for the illumination unit and the imaging unit such as modulation frequency and integration time.

Accordingly, a predetermined configuration mode including a set of configuration parameters of the ToF system is selected before the ToF system is put in operation for a given use case in order to ensure reliable ToF measurements. For example, an integration time may be preconfigured to avoid a saturation in the depth map.

However, it has been recognized that the set of configuration parameters should be controlled dynamically, and that more than one configuration parameter should be controlled in order to account for a variety of different situations.

Generally, it is known that in raw data (image data) or in a corresponding depth map of a scene quality issues may be present, e.g., due to noise, pixel saturation, interference, distance aliasing, multipath contributions and the like.

It has further been recognized that such quality issues may be avoided already in the measurement phase, rather than applying image correction algorithms afterwards on already acquired data for reducing quality issues for improving the depth map.

Moreover, in some cases, as generally known, when quality issues are already present in the raw data, it may be difficult to generate a depth map without quality issues.

For example, if an image sensor saturates, the depth information may be lost. However, there are other examples with more complex situations. For example, a wavelength of the light emitted to a scene may not be adapted to environmental conditions which may produce an attenuation of the light that may not allow to measure the depth anymore. For example, in a ToF system with multiple illumination units and imaging units (multi-ToF system), a configuration parameter of an illumination unit or imaging unit which may not be adapted for a multi-ToF system may end up producing an interfering signal in the recordings that may reduce the possibility of recovering the depth information. For example, a modulation frequency (in iToF systems) which may not be adapted for a scene, or a non-adapted histogram sampling interval (in dToF systems) may produce a loss of depth accuracy. For example, an illumination power setting which is not adapted to a scene may not allow to recover depth information. Moreover, in addition, the association of several of these cases may be even more complex and an adapted preconfiguring of the ToF system to account for such cases may be difficult to achieve.

Thus, it has been recognized that dependencies among the different configuration parameters and their influence on a quality of a ToF measurement may be difficult to predict analytically or with a fixed optimal setting.

Furthermore, it has been recognized that the configuration parameters should be dynamically adapted to a given scene or an identified quality issue such that corresponding quality issues may be reduced already in the measurement phase (data acquisition phase).

Moreover, it has been recognized that a (machine) learning algorithm, for instance, based on a neural network, may learn the complex, non-linear dependencies among the configuration parameters and may learn to find a trade-off solution of the configuration parameters for a given scene and/or an identified quality issue for improving a subsequent ToF measurement.

Hence, it has been recognized that, if a quality issue in a time-of-flight measurement may be identified, the learning algorithm may learn to determine configuration parameters which may be adapted to improve a subsequent time-of-flight measurement for reducing the identified quality issue.

Therefore, some embodiments pertain to a configuration control circuitry for a time-of-flight system, the time-of-flight system including an illumination unit configured to emit light to a scene and an imaging unit configured to generate image data representing a time-of-flight measurement of light reflected from the scene, wherein the configuration control circuitry is configured to:

- obtain the image data from the imaging unit and depth data representing a depth map of the scene, wherein the depth data is generated based on the image data;
- determine a set of configuration parameters for at least one of the illumination unit and the imaging unit, wherein the set of configuration parameters is determined with a learning algorithm, wherein the learning algorithm is based on a first sub-module and a second sub-module, wherein the first sub-module is configured to estimate, based on the obtained image data and the obtained depth data, a measurement indicator of the depth map, wherein the second sub-module is configured to estimate, based on the estimated measurement indicator, the set of configuration parameters for improving a subsequent time-of-flight measurement.

Generally, in some embodiments, the first sub-module estimates a measurement indicator, which is a feature extracted from the data and conveys information on its quality, noise level, and presence of artifacts such as pixel saturation, interference, distance aliasing, multipath contributions and the like. The second sub-module, in some embodiments, maps the feature to a set of configuration parameters, which represents an optimal ToF system setting given the measurement indicator.

In the following some general explanations regarding the implementation of the configuration control circuitry and the ToF system are made.

Generally, the ToF system may be a dToF or an iToF system and may be a full-field or a spot ToF system.

The configuration control circuitry may be included or may be part of the time-of-flight system. The configuration control circuitry may be embedded in a control unit or processing unit included in the ToF system. The configuration control circuitry may be included or may be part of an electronic device (e.g. a mobile device or a camera or the like) which may include the ToF system and the configuration control circuitry may communicate with the ToF system, for example, over a data bus (interface) (e.g. a Camera Serial Interface (CSI) in accordance with MIPI (Mobile Industry Processor Interface) specifications (e.g. MIPII CSI-2 or the like) or the like). The configuration control circuitry may include a data bus interface for transmitting (and receiving) data over a data bus.

The configuration control circuitry may be based on or may include or may be implemented as integrated circuitry logic or may be implemented by a CPU (central processing unit), an application processor, a graphical processing unit (GPU), a microcontroller, an FPGA (field programmable gate array), an ASIC (application specific integrated circuit) or the like. The functionality may be implemented by software executed by a processor such as an application processor or the like. The configuration control circuitry may be based on or may include or may be implemented by typical electronic components configured to achieve the functionality as described herein. The configuration control circuitry may be based on or may include or may be implemented in parts by typical electronic components and integrated circuitry logic and in parts by software.

The configuration control circuitry may include a communication interface configured to communicate and exchange data with a computer or processor (e.g. an application processor or the like) over a network (e.g. the internet) via a wired or a wireless connection such as WiFi®, Bluetooth® or a mobile telecommunications system which may be based on UMTS, LTE or the like (and implements corresponding communication protocols).

The configuration control circuitry may include data storage capabilities to store data such as memory which may be based on semiconductor storage technology (e.g. RAM, EPROM, etc.) or magnetic storage technology (e.g. a hard disk drive) or the like.

The ToF system includes an illumination unit, an imaging unit and a control unit for controlling the overall operation of the ToF system.

The illumination unit includes a light source and may include optical parts such as lenses and the like. The light source may be a laser (e.g. a laser diode) or a plurality of lasers (e.g. a plurality of laser diodes arranged in rows and columns as an array), a light emitting diode (LED) or a plurality of LEDs (e.g. a plurality of LEDs arranged in rows and columns as an array), or the like. The illumination unit may emit visible light or infrared red, or the like.

The imaging unit includes an image sensor (with read-out circuitry) and may include optical parts such as lenses and the like. The image sensor may include a pixel circuitry having the plurality of pixels (arranged according to a predetermined pattern, e.g., in rows and columns as an array in the image sensor) generating pixel values in accordance with an amount light incident onto each pixel.

The plurality of pixels may be current assisted photonic demodulator (CAPD) pixels, single photon avalanche diode (SPAD) pixels, photodiode pixels or active pixels based on, for example, CMOS (complementary metal oxide semiconductor) technology, etc.

The image data may be pixel values of each pixel of the image sensor or component data (for iToF systems) or a histogram (for dToF systems).

In the following some general explanations regarding the function of the configuration control circuitry are made.

The configuration control circuitry determines a set of configuration parameters for at least one of the illumination unit and the imaging unit.

The set of configuration parameters may include one or more configuration parameters of at least one of the imaging unit and the illumination unit. The set of configuration parameters determined by the configuration control circuitry are, for example, sent to the control unit of the ToF system which sets the configuration parameters included in the set of configuration parameters in a subsequent ToF measurement, while other configuration parameter are kept as before.

In some embodiments, the set of configuration parameters includes at least one of an output power, an illumination pattern or a wavelength of the light emitted to the scene.

The output power may be the optical power output by the illumination unit (or light source). Thus, the configuration control circuitry may determine, e.g., a current value of the light source or the like.

The illumination pattern may be controlled by an adaptable lens portion in the illumination unit. The illumination pattern may be controlled by adjusting an output power of individual light source elements (may also be switched on and off) of the light source in the illumination unit, for example, individual laser diodes, LEDs, etc. in an array or the like. Thus, the configuration control circuitry may determine, e.g., a current value for each individual light source elements of the light source or the like.

The sensor integration time (i.e., the exposure time) may be controlled by modifying the image sensor settings, e.g., increasing the length of the period at which the sensor accumulates charges.

The wavelength may be controlled by adjusting a current through a laser diode and a temperature of the laser diode (e.g. thermoelectrical cooling element) or by switching between LEDs with different wavelengths or the like. Thus, the configuration control circuitry may determine such values.

In some embodiments, the time-of-flight system is an indirect time-of-flight system and the set of configuration parameters includes at least one of a modulation frequency and a duty cycle of the light emitted to the scene. Thus, the configuration control circuitry may determine the modulation frequency or the duty cycle.

The modulation frequency and duty cycle may be controlled by adjusting the illumination and image sensor settings accordingly.

In some embodiments, the set of configuration parameters includes at least one of an integration time (sensor integration time) and a pixel binning.

The pixel binning may be controlled by analog or digital pixel binning in the image sensor, for example, by averaging two or more rows or two or more columns or the like, as generally known. Thus, the configuration control circuitry may determine, e.g., how many rows or columns should be averaged or the like.

In some embodiments, the time-of-flight system is a direct time-of-flight system and the set of configuration parameters includes at least one of a sampling interval and a detection efficiency.

The detection efficiency may be controlled, for example, in SPAD pixels by adjusting the threshold trigger of the SPAD pixels, as generally known. The configuration control circuitry may determine, e.g., a gain value or the like.

The configuration control circuitry determines the set of configuration parameters with a (machine) learning algorithm, which may be embodied by a neural network. The (machine) learning algorithm is based on a first sub-module (e.g., a sub-(neural)network) and a second sub-module (e.g., a sub-(neural)network). Both modules may be implemented or may be based on a known learning algorithm (e.g., logistic regression, decision trees, or support vector machines or the like) or a (deep, convolutional, or recursive) neural network or the like, with the common property that such algorithms need to be trained to deliver optimal performances. As generally known, learning algorithms such as neural networks are suitable for detecting complex patterns and complex relations between input and output variables in a variety of cases, without the need to engineer features specific to each case.

Thus, the first sub-module is configured to estimate, based on the obtained image data and the obtained depth data, a measurement indicator of the depth map.

Generally, the measurement indicator is indicative for a quality issue in the depth map or in ToF data (including image data and depth data). The measurement indicator is a feature extracted from the data (image data and depth map) and is specific to a type of quality issue and the extent (e.g. number of saturated pixels, noise variance) of the quality issue.

As discussed above, if a quality issue in a time-of-flight measurement may be identified, a set of configuration parameters may be determined for improving a subsequent time-of-flight measurement, since the determined set of configuration parameters may be adapted for reducing the quality issue.

It has been recognized that depth data representing a depth map may not include sufficient information for estimating a quality issue in the depth map, since the depth data is already processed data which may obfuscate some details about quality issues in the measurement phase (data acquisition phase).

Hence, it has been recognized that additionally raw data (the image data) should be used for estimating a quality issue in the depth map.

Thus, the first sub-module estimates the measurement indicator of the depth map, based on the obtained image data and the obtained depth data.

In some embodiments, the estimated measurement indicator is indicative of at least one of the following (quality issues): pixel saturation, noise level, multipath contribution, distance aliasing/phase wrapping, interference, motion blur.

For example, the noise level may be identified by analyzing the SNR. For example, the multipath contribution may be identified by analyzing the component data (IQ values). For example, the distance aliasing/phase wrapping may be identified by large phase jumps between neighboring pixels.

Generally, these types of quality issues are known to the skilled person, however, it may be difficult to predict how such quality issues may be reduced for a given scene or in a subsequent ToF measurement, since dependencies among the different configuration parameters and their influence on a quality of a ToF measurement of a given scene may be highly non-linear, analytically unknown, and difficult to predict.

However, it has been recognized that learning algorithms, such as neural networks, may be trained (as will be discussed under reference of FIGS. 5 and 6) to estimate such quality issues and to estimate a set of configuration parameters for reducing such quality issues.

Thus, the second sub-module, e.g., a neural network, is configured to estimate, based on the estimated measurement indicator, the set of configuration parameters for improving a subsequent time-of-flight measurement.

Generally, the use of learning algorithms may allow to determine a combination of configuration parameters of the ToF system, since a learning algorithm can be trained to deduce configuration parameter interdependencies which may be difficult to predict otherwise.

In some embodiments, the second sub-module (e.g., a sub-network) estimates the set of configuration parameters further based on a set of predetermined configuration parameters of at least one of the illumination unit and the imaging unit.

The set of predetermined configuration parameters indicates the configuration parameters which are not allowed to be changed, for example, due to technologic or physical constraints of the ToF system.

In some embodiments, the second sub-module (e.g., a sub-network) estimates the set of configuration parameters further based on a set of predetermined configuration parameters of the illumination unit and the imaging unit and a set of predetermined configuration parameter limits of at least one of the illumination unit and the imaging unit.

The set of predetermined configuration parameter limits indicates the limits in which the configuration parameters are allowed to be changed, for example, due to technologic or physical constraints of the ToF system.

In some embodiments, the learning algorithm is trained based on real and/or simulated time-of-flight data and real and/or simulated ground truth data.

In some embodiments, the configuration control circuitry is further configured to generate the depth data based on the obtained image data.

Some embodiments pertain to a (corresponding) configuration control method for a time-of-flight system, the time-of-flight system including an illumination unit configured to emit light to a scene and an imaging unit configured to generate image data representing a time-of-flight measurement of light reflected from the scene, the configuration control method including:

obtaining the image data from the imaging unit and depth data representing a depth map of the scene, wherein the depth data is generated based on the image data;

determining a set of configuration parameters for at least one of the illumination unit and the imaging unit, wherein the set of configuration parameters is determined with a learning algorithm, wherein the learning algorithm is based on a first sub-module and a second sub-module, wherein the first sub-module is configured to estimate, based on the obtained image data and the obtained depth data, a measurement indicator of the depth map, wherein the second sub-module is configured to estimate, based on the estimated measurement indicator, the set of configuration parameters for improving a subsequent time-of-flight measurement.

The configuration control method may be performed by electronic components, integrated circuitry logic, CPU, FPGA, software or in parts by electronic components and in parts by software executed by a processor or the like. The method may also be performed by the configuration control circuitry, as discussed herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 2, which schematically illustrates in a block diagram a first embodiment of a configuration control circuitry 20-1 for an iToF system 10, the first embodiment of the configuration control circuitry 20-1 is discussed under reference of FIG. 2 in the following.

The iToF system 10 includes an illumination unit 11, an imaging unit 12 and a control unit 13.

Even though the embodiment of FIG. 2 shows an iToF system 10, the embodiment may be similar for a dToF system.

The imaging unit 12 includes an image sensor 14 (e.g. a CAPD pixel array) and an optical lens portion 15.

The control unit 13 controls the overall operation of the iToF system 10 and sets configuration parameters of the illumination unit 11 and the imaging unit 12 for a ToF measurement.

The illumination unit 11 includes a light source (not shown, e.g., a laser diode array) and emits modulated light to a scene 16 in which an object 17 is present.

The imaging unit 12 generates image data 18 representing a ToF measurement based on light reflected from the object 17 in the scene 16, as discussed under reference of FIG. 1A (thus a more detailed description is omitted in order to avoid unnecessary repetition).

The iToF system 10 further includes a processing unit 19.

The processing unit 19 includes the configuration control circuitry 20-1 and a depth map generation unit 21.

The image data 18 output by the imaging unit 12 via the control unit 13 is sent to the configuration control circuitry 20-1 and the depth map generation 21.

The depth generation unit 21 obtains the image data 18 and generates depth data 22, based on the obtained image data 18, representing a depth map of the scene 16 and sends the depth data 22 to the configuration control circuitry 20-1 and to an application processor (not shown) for further processing.

The configuration control circuitry 20-1 obtains the image data 18 and the depth data 22.

The configuration control circuitry 20-1 determines with a learning algorithm (not shown), based on the obtained image data 18 and the obtained depth data 22, a set of configuration parameters 23 for at least one of the illumination unit 11 and the imaging unit 12 for improving a subsequent ToF measurement. The learning algorithm may be based on a neural network, support vector machines, decision trees, regression techniques, or the like.

The configuration control circuitry 20-1 sends the determined set of configuration parameters 23 to the control unit 13 which sets corresponding configuration parameters of at least one of the illumination unit 11 and the imaging unit 12 in accordance with the determined set of configuration parameters 23.

Figure 3:
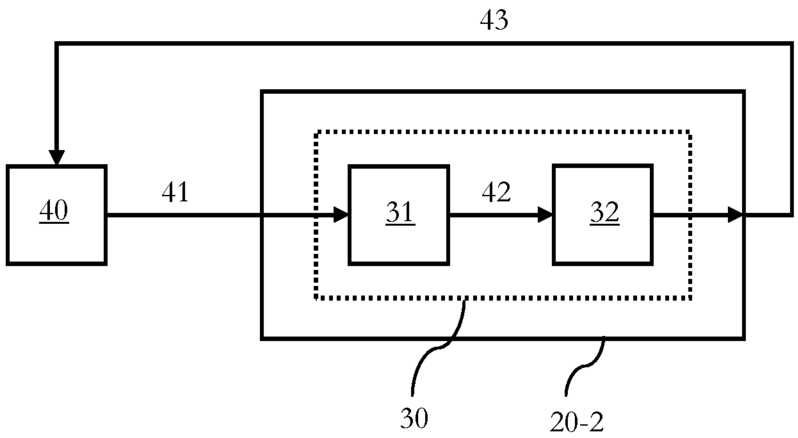
FIG. 3 schematically illustrates in a block diagram a second embodiment of a configuration control circuitry for a time-of-flight system.

FIG. 3 schematically illustrates in a block diagram a second embodiment of a configuration control circuitry 20-2 for a ToF system 40.

Generally, the ToF system 40 may be a dToF system or an iToF system, wherein for illustration purposes, in the following, it is assumed that the ToF system 40 is an iToF system.

The ToF system 40 generates ToF data 41 (including image data and depth data) of a scene and sends the ToF data 41 to the configuration control circuitry 20-2 (which it obtains).

The configuration control circuitry 20-2 includes a (trained) neural network 30 which is based on a (trained) first sub-network 31 and a (trained) second sub-network 32.

Generally, as mentioned, the (trained) neural network 30 (as an example of a learning algorithm), the (trained) first sub-network 31 (as an example of a first sub-module) and the (trained) second sub-network 32 (as an example of a second sub-module) may be replaced in other embodiments with other learning algorithms such as learning algorithms based on support vector machines, decision trees or regression techniques. This also applies to the embodiments discussed under reference of FIG. 5 and FIG. 6 further below.

Then, the configuration control circuitry 20-2 inputs the ToF data 41 to the first sub-network 31.

The first sub-network 31 is configured to estimate, based on the obtained ToF data, a measurement indicator 42.

The estimated measurement indicator 42 output by the first sub-network 42 is indicative for a quality issue in the ToF data 41 related to, for example, a saturation, a noise level, a multipath contribution, a distance aliasing, an interference, or a motion blur. The estimated measurement indicator 42 is indicative for a type of the quality issues and a size of the quality issue.

For example, the measurement indicator 42 output by the first sub-network indicates that a quality issue related to a noise level is present in the ToF data 41.

Then, the estimated measurement indicator 42 is input to the second sub-network 32.

The second sub-network is configured to estimate, based on the estimated measurement indicator 42, a set of configuration parameters 43 for the ToF system 40.

The set of configuration parameters 43 is fed back to the ToF system 40, thereby the configuration parameters of the ToF system 40 are continuously adjusted for improving a subsequent ToF measurement.

For example, the configuration control circuitry 20-2 may continuously determine an integration time of an image sensor in an imaging unit and an output power of an illumination unit for increasing a SNR (the SNR may be a quality metric for the noise level) when the measurement indicator 42 is indicative for the noise level (quality issue).

Figure 4:
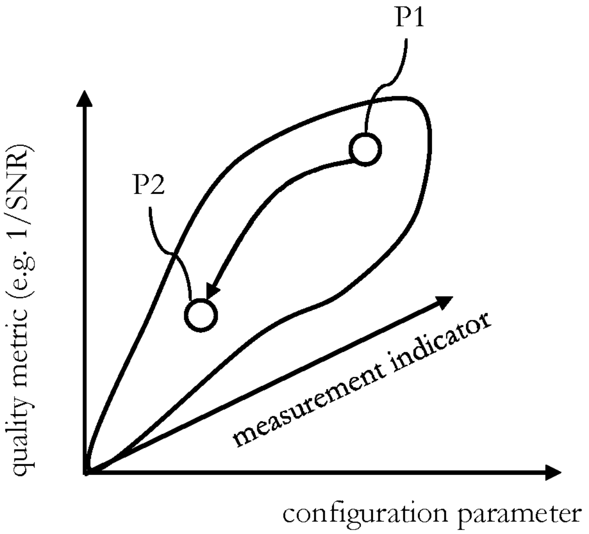
FIG. 4 schematically illustrates an embodiment of adjusting a configuration parameter in a ToF system.

FIG. 4 schematically illustrates an embodiment of adjusting a configuration parameter in a ToF system.

The diagram in FIG. 4 shows a three-dimensional coordinate system (for illustration purposes only, since more than one configuration parameter may be adjusted) given by a configuration parameter, a measurement indicator, and a quality metric.

Initially, for example, after starting the ToF system, a point P1 characterizes the ToF system's configuration and ToF measurement quality. In P1, the measurement indicator may be indicative for a noise level (quality issue), which results in a first value of an associated quality metric (here, e.g., the reciprocal of the SNR) when the configuration parameter (e.g., an output power of an illumination unit) has a first value.

Then, a configuration control circuitry (e.g. the configuration control circuitry 20-2 of FIG. 3) determines a second value for the output power of the illumination unit.

Then, in a subsequent ToF measurement, a point P2 characterizes the ToF system's configuration and ToF measurement quality. In P2, the measurement indicator is indicative for the noise level (quality issue) that is less than in P1, which results in a second value lower than the first value of the associated quality metric when the configuration parameter has the second value.

Thus, by continuously adjusting the configuration parameter, the SNR or noise level may be improved.

Figure 5:
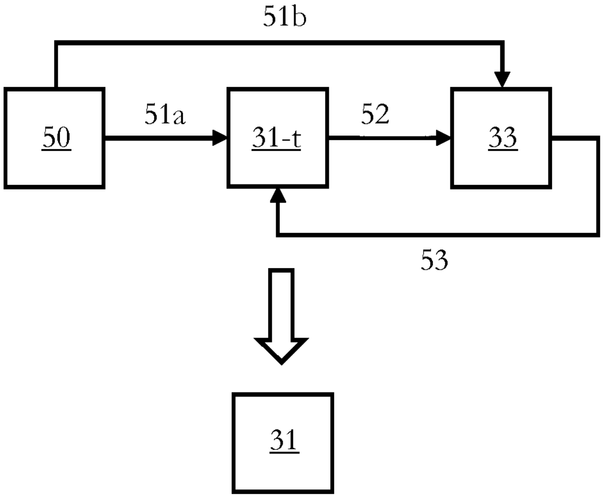
FIG. 5 schematically illustrates in a block diagram an embodiment of a training procedure of a first sub-network of a neural network.

FIG. 5 schematically illustrates in a block diagram an embodiment of a training procedure of a first sub-network 31-*t* of a neural network.

The first sub-network 31-*t* is in a training stage and is trained with a dataset 50 in order to learn identifying quality issues in ToF data and to estimate a measurement indicator of a depth map.

In the following, a ToF dataset includes image data representing a ToF measurement of a scene (the ToF measurement may be a real or a simulated ToF measurement), depth data representing a depth map of the scene, and a feature which is a measurement indicator for the depth map of the scene.

A dataset 50 includes a plurality of ToF datasets representing ToF measurements of a plurality of scenes with quality issues and a plurality of ground truth ToF datasets representing ToF measurements of the same plurality of scenes without quality issues.

The plurality of ToF datasets includes ToF datasets with various features such that ToF datasets with each of a saturation (quality issue), a noise level (quality issue), a multipath contribution (quality issue), a distance aliasing (quality issue), an interference (quality issue) and a motion blur (quality issue) are included.

Accordingly, the first sub-network 31-*t* is trained with a plurality of ToF datasets with saturation quality issues, with a plurality of ToF datasets with noise level quality issues, etc.

Thus, estimating of a measurement indicator indicative for at least one of a saturation, a noise level, a multipath contribution, a distance aliasing, an interference and a motion blur is trained.

In the training stage, ToF data 51*a* is input to the first sub-network 31-*t* which estimates a measurement indicator 52.

The measurement indicator 52 is input to a loss function 33 which has also a target feature 51*b* as input. Here, the target feature 51*b* is the measurement indicator corresponding to the ToF data 51*a*.

Based on a difference between the estimated measurement indicator 52 and the target feature 51*b*, the loss function 33 is optimized to determine the best-fitting weights 53 which are then assigned to the first sub-network 31-*t*.

Here, in a first training stage, the first sub-network 31-*t* is trained with the plurality of ground truth ToF datasets for training the first sub-network 31-*t* for identifying ToF data without quality issues.

Then, in a second training stage, the first sub-network 31-*t* is trained based on a difference between a ToF dataset with quality issues and a corresponding (same scene) ground truth ToF dataset for identifying quality issue patterns (and thus estimating the measurement indicator).

Then, in a third training stage, the first sub-network 31-*t* is trained with the plurality of ToF datasets for identifying the quality issue in ToF data or depth maps (and thus estimating the measurement indicator).

Once the training of the first sub-network 31-*t* is completed, the (trained) first sub-network 31 is obtained.

Figure 6:
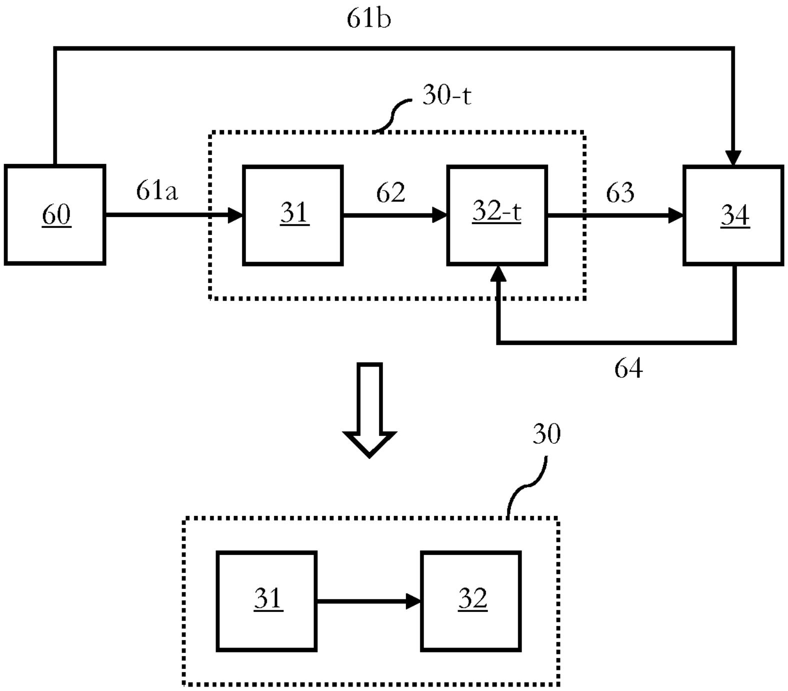
FIG. 6 schematically illustrates in a block diagram an embodiment of a training procedure of a neural network.

FIG. 6 schematically illustrates in a block diagram an embodiment of a training procedure of a neural network 30-*t*.

The neural network 30-*t* is in a training stage and is based on a (trained) first sub-network 31 and a second sub-network 32-*t* in a training stage.

The neural network 30-*t* and the second sub-network 32-*t* is trained with a dataset 60 in order to learn determining a set of configuration parameters for at least one of an illumination unit and an imaging unit.

In the following, a ToF dataset includes image data representing a ToF measurement of a scene (the ToF measurement may be a real or a simulated ToF measurement), depth data representing a depth map of the scene, and a feature which is a set of configuration parameters for at least one of an illumination unit and an imaging unit.

A dataset 60 includes a plurality of ToF datasets representing ToF measurements of a plurality of scenes with quality issues due to non-optimal configuration parameters and a plurality of ground truth ToF datasets representing ToF measurements of the same plurality of scenes without quality issues due to optimal configuration parameters.

The plurality of ToF datasets includes ToF datasets with various quality issues such as a saturation (quality issue), a noise level (quality issue), a multipath contribution (quality issue), a distance aliasing (quality issue), an interference (quality issue), and a motion blur (quality issue).

Accordingly, the neural network 30-*t* and the second sub-network 32-*t* is trained with a plurality of ToF datasets with saturation quality issues, with a plurality of ToF datasets with noise level quality issues, etc. due to various non-optimal configuration parameters.

Thus, determining the set of configuration parameters is trained for various quality issues for various scenes.

In the training stage, ToF data 61*a* is input to the first sub-network 31 which estimates a measurement indicator 62.

The measurement indicator 62 is input to the second sub-network 32-*t*. Based on the measurement indicator 62, the second sub-network 32-*t* estimates a set of configuration parameters 63. The estimated set of configuration parameters is input to a loss function 34 which has also a target feature 61*b* as input. Here, the target feature 61*b* is the set of configuration parameters (which may be represented by a vector of configuration parameters) corresponding to the ground truth configuration parameters, that is the optimal configuration parameters for a scene.

Based on a difference between the estimated set of configuration parameters 63 and the target feature (e.g., the vector of ground truth configuration parameters) 61*b*, the loss function 34 determines weight updates 64 which are fed back to the second sub-network 32-*t*.

Here, in a first training stage, the second sub-network 32-*t* is trained with the plurality of ground truth ToF datasets for training the second sub-network 32-*t* for determining a set of configuration parameters for ToF data without quality issues.

Then, in a second training stage, the second sub-network 32-*t* is trained with the plurality of ToF datasets for determining a set of configuration parameters for a given scene and a given quality issue, since the second sub-network 32-*t* learns that the given quality issue is due to the difference between the estimated set of configuration parameters 63 and the set of ground truth configuration parameters 61*b*. Thus, it is trained to reduce the difference. Thus, it is trained to estimate a set of configuration parameters closer to ground truth configuration parameters based on an estimated measurement indicator.

Once the training of the second sub-network 32-*t* is completed, the (trained) neural network 30 and the (trained) second sub-network 32 are obtained.

Figure 7:
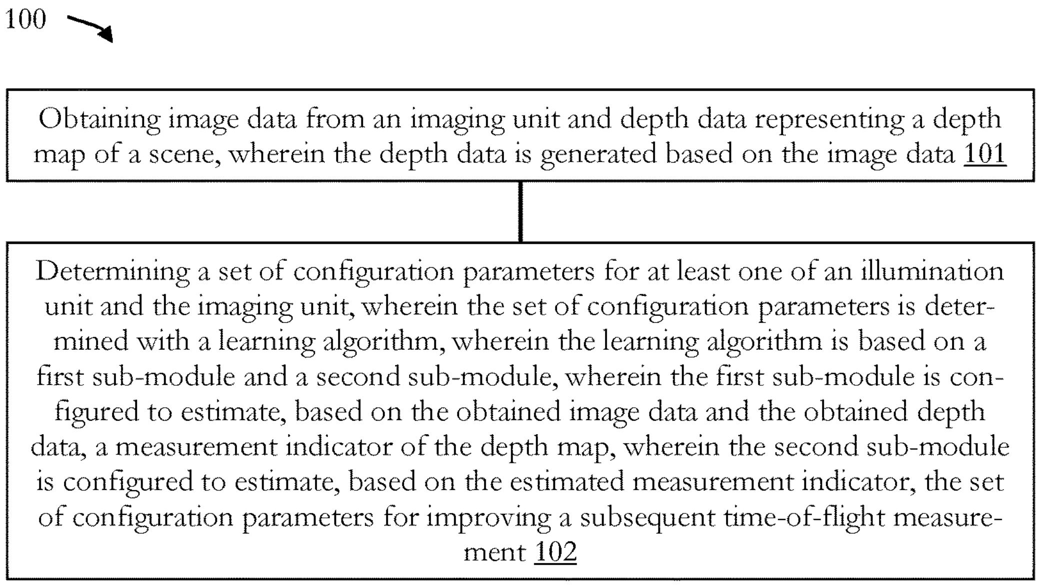
FIG. 7 schematically illustrates in a flow diagram a first embodiment of a configuration control method.

FIG. 7 schematically illustrates in a flow diagram a first embodiment of a configuration control method 100.

At 101, image data is obtained from an imaging unit and depth data representing a depth map of a scene is obtained, wherein the depth data is generated based on the image data, as discussed herein.

At 102, a set of configuration parameters for at least one of an illumination unit and the imaging unit is determined, wherein the set of configuration parameters is determined with a learning algorithm, wherein the learning algorithm is based on a first sub-module and a second sub-module, wherein the first sub-module is configured to estimate, based on the obtained image data and the obtained depth data, a measurement indicator of the depth map, wherein the second sub-module is configured to estimate, based on the estimated measurement indicator, the set of configuration parameters for improving a subsequent time-of-flight measurement, as discussed herein.

Figure 8:
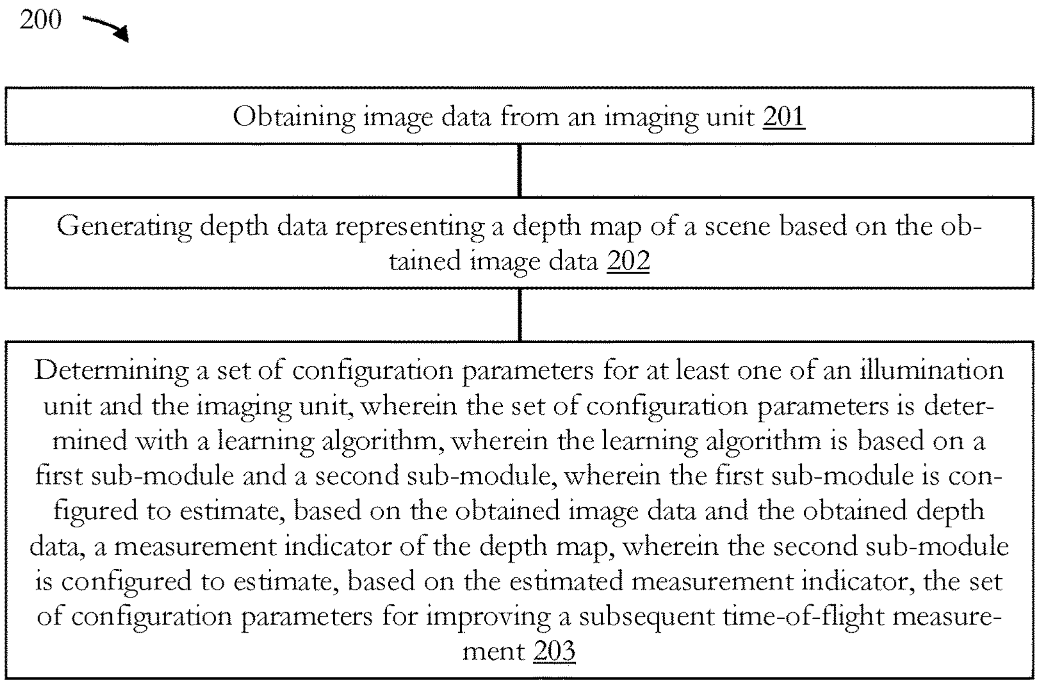
FIG. 8 schematically illustrates in a flow diagram a second embodiment of a configuration control method.

FIG. 8 schematically illustrates in a flow diagram a second embodiment of a configuration control method 200.

At 201, image data is obtained from an imaging unit, as discussed herein.

At 202, depth data representing a depth map of a scene is generated based on the obtained image data, as discussed herein.

At 203, a set of configuration parameters for at least one of an illumination unit and the imaging unit is determined, wherein the set of configuration parameters is determined with a learning algorithm, wherein the learning algorithm is based on a first sub-module and a second sub-module, wherein the first sub-module is configured to estimate, based on the obtained image data and the obtained depth data, a measurement indicator of the depth map, wherein the second sub-module is configured to estimate, based on the estimated measurement indicator, the set of configuration parameters for improving a subsequent time-of-flight measurement, as discussed herein.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A configuration control circuitry for a time-of-flight system, the time-of-flight system including an illumination unit configured to emit light to a scene and an imaging unit configured to generate image data representing a time-of-flight measurement of light reflected from the scene, wherein the configuration control circuitry is configured to:

obtain the image data from the imaging unit and depth data representing a depth map of the scene, wherein the depth data is generated based on the image data;

determine a set of configuration parameters for at least one of the illumination unit and the imaging unit, wherein the set of configuration parameters is determined with a learning algorithm, wherein the learning algorithm is based on a first sub-module and a second sub-module, wherein the first sub-module is configured to estimate, based on the obtained image data and the obtained depth data, a measurement indicator of the depth map, wherein the second sub-module is configured to estimate, based on the estimated measurement indicator, the set of configuration parameters for improving a subsequent time-of-flight measurement.

(2) The configuration control circuitry of (1), wherein the estimated measurement indicator is indicative for at least one of a pixel saturation, a noise level, a multipath contribution, a distance aliasing, an interference, and a motion blur.

(3) The configuration control circuitry of (1) or (2), wherein the set of configuration parameters includes at least one of an output power, an illumination pattern or a wavelength of the light emitted to the scene.

(4) The configuration control circuitry of anyone of (1) to (3), wherein the time-of-flight system is an indirect time-of-flight system and the set of configuration parameters includes at least one of a modulation frequency and a duty cycle of the light emitted to the scene.

(5) The configuration control circuitry of anyone of (1) to (4), wherein the set of configuration parameters includes at least one of an integration time and a pixel binning.

(6) The configuration control circuitry of anyone of (1) to (5), wherein the time-of-flight system is a direct time-of-flight system and the set of configuration parameters includes at least one of a sampling interval and a detection efficiency.

(7) The configuration control circuitry of anyone of (1) to (6), wherein the configuration control circuitry is further configured to generate the depth data based on the obtained image data.

(8) The configuration control circuitry of anyone of (1) to (7), wherein the second sub-module estimates the set of configuration parameters further based on a set of predetermined configuration parameters of at least one of the illumination unit and the imaging unit.

(9) The configuration control circuitry of anyone of (1) to (8), wherein the second sub-module estimates the set of configuration parameters further based on a set of predetermined configuration parameters of the illumination unit and the imaging unit and a set of predetermined configuration parameter limits of at least one of the illumination unit and the imaging unit.

(10) The configuration control circuitry of anyone of (1) to (9), wherein the neural network is trained based on real or simulated time-of-flight data and real or simulated ground truth data.

(11) A configuration control method for a time-of-flight system, the time-of-flight system including an illumination unit configured to emit light to a scene and an imaging unit configured to generate image data representing a time-of-flight measurement of light reflected from the scene, the configuration control method including:

obtaining the image data from the imaging unit and depth data representing a depth map of the scene, wherein the depth data is generated based on the image data;

determining a set of configuration parameters for at least one of the illumination unit and the imaging unit, wherein the set of configuration parameters is determined with a learning algorithm, wherein the learning algorithm is based on a first sub-module and a second sub-module, wherein the first sub-module is configured to estimate, based on the obtained image data and the obtained depth data, a measurement indicator of the depth map, wherein the second sub-module is configured to estimate, based on the estimated measurement indicator, the set of configuration parameters for improving a subsequent time-of-flight measurement.

(12) The configuration control method of (11), wherein the estimated measurement indicator is indicative for at least one of a pixel saturation, a noise level, a multipath contribution, a distance aliasing, an interference, and a motion blur.

(13) The configuration control method of (11) or (12), wherein the set of configuration parameters includes at least one of an output power, an illumination pattern or a wavelength of the light emitted to the scene.

(14) The configuration control method of anyone of (11) to (13), wherein the time-of-flight system is an indirect time-of-flight system and the set of configuration parameters includes at least one of a modulation frequency and a duty cycle of the light emitted to the scene.

(15) The configuration control method of anyone of (11) to (14), wherein the set of configuration parameters includes at least one of an integration time and a pixel binning.

(16) The configuration control method of anyone of (11) to (15), wherein the time-of-flight system is a direct time-of-flight system and the set of configuration parameters includes at least one of a sampling interval and a detection efficiency.

(17) The configuration control method of anyone of (11) to (16), further including:

generating the depth data based on the obtained image data.

(18) The configuration control method of anyone of (11) to (17), wherein the second sub-module estimates the set of configuration parameters further based on a set of predetermined configuration parameters of at least one of the illumination unit and the imaging unit.

(19) The configuration control method of anyone of (11) to (18), wherein the second sub-module estimates the set of configuration parameters further based on a set of predetermined configuration parameters of the illumination unit and the imaging unit and a set of predetermined configuration parameter limits of at least one of the illumination unit and the imaging unit.

(20) The configuration control method of anyone of (11) to (19), wherein the neural network is trained based on real or simulated time-of-flight data and real or simulated ground truth data

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. A configuration control circuitry for a time-of-flight system, the time-of-flight system comprising an illumination unit configured to emit light to a scene and an imaging unit configured to generate image data representing a time-of-flight measurement of light reflected from the scene, the configuration control circuitry being configured to:

obtain the image data from the imaging unit and depth data representing a depth map of the scene, wherein the depth data is generated based on the image data;

determine a set of configuration parameters for at least one of the illumination unit and the imaging unit, wherein the set of configuration parameters is determined with a learning algorithm, wherein the learning algorithm is based on a first sub-module and a second sub-module, wherein the first sub-module is configured to estimate, based on the obtained image data and the obtained depth data, a measurement indicator of the depth map, wherein the second sub-module is configured to estimate, based on the estimated measurement indicator, the set of configuration parameters for improving a subsequent time-of-flight measurement.

2. The configuration control circuitry according to claim 1, wherein the estimated measurement indicator is indicative for at least one of a pixel saturation, a noise level, a multipath contribution, a distance aliasing, an interference, and a motion blur.

3. The configuration control circuitry according to claim 1, wherein the set of configuration parameters includes at least one of an output power, an illumination pattern or a wavelength of the light emitted to the scene.

4. The configuration control circuitry according to claim 1, wherein the time-of-flight system is an indirect time-of-flight system and the set of configuration parameters includes at least one of a modulation frequency and a duty cycle of the light emitted to the scene.

5. The configuration control circuitry according to claim 1, wherein the set of configuration parameters includes at least one of an integration time and a pixel binning.

6. The configuration control circuitry according to claim 1, wherein the time-of-flight system is a direct time-of-flight system and the set of configuration parameters includes at least one of a sampling interval and a detection efficiency.

7. The configuration control circuitry according to claim 1, wherein the configuration control circuitry is further configured to generate the depth data based on the obtained image data.

8. The configuration control circuitry according to claim 1, wherein the second sub-module estimates the set of configuration parameters further based on a set of predetermined configuration parameters of at least one of the illumination unit and the imaging unit.

9. The configuration control circuitry according to claim 1, wherein the second sub-module estimates the set of configuration parameters further based on a set of predetermined configuration parameters of the illumination unit and the imaging unit and a set of predetermined configuration parameter limits of at least one of the illumination unit and the imaging unit.

10. The configuration control circuitry according to claim 1, wherein the learning algorithm comprises a neural network, and the neural network is trained based on real or simulated time-of-flight data and real or simulated ground truth data.

11. A configuration control method for a time-of-flight system, the time-of-flight system including an illumination unit configured to emit light to a scene and an imaging unit configured to generate image data representing a time-of-flight measurement of light reflected from the scene, the configuration control method comprising:

obtaining the image data from the imaging unit and depth data representing a depth map of the scene, wherein the depth data is generated based on the image data;

determining a set of configuration parameters for at least one of the illumination unit and the imaging unit, wherein the set of configuration parameters is determined with a learning algorithm, wherein the learning algorithm is based on a first sub-module and a second sub-module, wherein the first sub-module is configured to estimate, based on the obtained image data and the obtained depth data, a measurement indicator of the depth map, wherein the second sub-module is configured to estimate, based on the estimated measurement indicator, the set of configuration parameters for improving a subsequent time-of-flight measurement.

12. The configuration control method according to claim 11, wherein the estimated measurement indicator is indicative for at least one of a pixel saturation, a noise level, a multipath contribution, a distance aliasing, an interference, and a motion blur.

13. The configuration control method according to claim 11, wherein the set of configuration parameters includes at least one of an output power, an illumination pattern or a wavelength of the light emitted to the scene.

14. The configuration control method according to claim 11, wherein the time-of-flight system is an indirect time-of-flight system and the set of configuration parameters includes at least one of a modulation frequency and a duty cycle of the light emitted to the scene.

15. The configuration control method according to claim 11, wherein the set of configuration parameters includes at least one of an integration time and a pixel binning.

16. The configuration control method according to claim 11, wherein the time-of-flight system is a direct time-of-flight system and the set of configuration parameters includes at least one of a sampling interval and a detection efficiency.

17. The configuration control method according to claim 11, further comprising:

generating the depth data based on the obtained image data.

18. The configuration control method according to claim 11, wherein the second sub-module estimates the set of configuration parameters further based on a set of predetermined configuration parameters of at least one of the illumination unit and the imaging unit.

19. The configuration control method according to claim 11, wherein the second sub-module estimates the set of configuration parameters further based on a set of predetermined configuration parameters of the illumination unit and the imaging unit and a set of predetermined configuration parameter limits of at least one of the illumination unit and the imaging unit.

20. The configuration control method according to claim 11, wherein the learning algorithm comprises a neural network, and the neural network is trained based on real or simulated time-of-flight data and real or simulated ground truth data.

* * * * *